C. J. GOODWIN.
GAS AND LIQUID CONTACT DEVICE.
APPLICATION FILED JAN. 19, 1918.

1,360,928.

Patented Nov. 30, 1920.

Inventor:-
Camillo Joseph Goodwin,

UNITED STATES PATENT OFFICE.

CAMILLO JOSEPH GOODWIN, OF LONDON, ENGLAND.

GAS AND LIQUID CONTACT DEVICE.

1,360,928.  Specification of Letters Patent.  Patented Nov. 30, 1920.

Application filed January 19, 1918. Serial No. 212,829.

*To all whom it may concern:*

Be it known that I, CAMILLO JOSEPH GOODWIN, a subject of the King of Great Britain and Ireland, and a resident of 60 Mark Lane, London, E. C. 3, England have invented certain new and useful Improvements in Gas and Liquid Contact Devices, of which the following is a specification.

This invention relates to improvements in filling materials for use in absorption, concentration, or re-action towers, in apparatus for washing, purifying and (or) recovering gases or solvents, in columns mounted on distilling apparatus and for other like purposes.

It has been found that in order to obtain the best and most economical results a filling material should present a large surface to the gases or vapors and at the same time should itself occupy a relatively small volume compared with that of the tower, or container so that the volume, or cubic capacity of the latter available for the passage of the gases, or vapors be reduced as little as possible by the filling material.

Filling materials have already been devised consisting of plain cylinders, and arranged either regularly or irregularly within the tower.

My invention has considerable advantages over this known form of tower filling material. I have found that it is not sufficient for the path of the gas to be a tortuous one, or for the gas to be continually deflected from one surface to another, but that greatly improved results are obtained if the velocity of the gases within the tower be very frequently changed, the effect of this being to set up eddies and thus continually to present fresh particles of gas to the wetted surfaces of the filling material.

According to this invention this object is achieved by constructing the filling material of a shape obtained by joining together two hollow truncated cones at their smaller ends and rounding or smoothing off the junction whereby the cross section offered to the gases in their passage through the tower is constantly being varied. The effect of this is that the gases are constantly and alternately throttled and allowed to expand, their velocity thereby being alternately increased and decreased. In this way the eddies and the mixing action which are necessary for efficient working are obtained.

The invention is carried out as follows, and two methods of carrying it out are illustrated in the accompanying drawings in which:—

Figure 1:
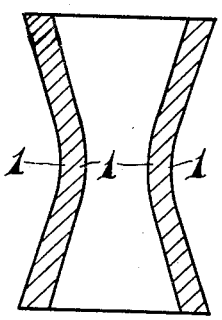
Figures 1 and 2 show sectional elevations of two modifications of one unit of my improved filler.

Referring to the drawings the improved filling material consists of a plurality of bodies, or units constructed in the shape of two hollow truncated cones, united at their smaller ends, at which part both the interior and exterior junction points are rounded or smoothed off as at 1, thus leaving a unit substantially of the same shape as a dice throwing box open both at the top and bottom.

Figure 3:
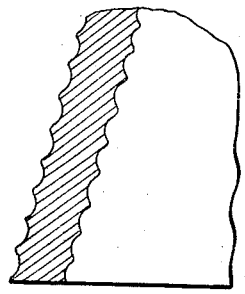
Fig. 3 is a detail sectional view of a unit constructed in accordance with a modification of this invention.
Figure 2:
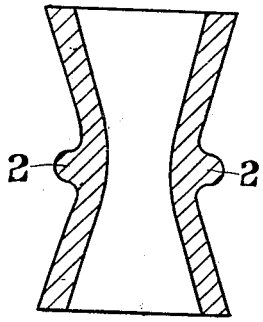

The bodies may be made as shown in Fig. 2 with a collar 2 around their center, and they may be made of any suitable material such as thin sheet metal, wire gauze, or cast metal. They may also, if desired, be constructed of acid resisting material such as porcelain, stoneware, hard rubber or acid resisting cast iron or brick. The bodies may further, if desired, be provided with corrugations either externally or internally, as shown in Fig. 3, and the corrugations may be either vertical or horizontal or spiral. Further, if desired, they may be provided with any suitable construction for the purpose of increasing the scrubbing surface and reducing the volume actually occupied by the filler.

The operation of the invention is as follows:—

The bodies are arranged in the tower either regularly, in the well known manner, or they may simply be dropped or poured into the tower and allowed to arrange themselves irregularly. In the latter case it will be preferable to use the shape illustrated in Fig. 2 as the collar 2 will prevent too close a contact between contiguous bodies.

Whether the bodies be arranged regularly, or irregularly they will insure the desired continuous alternate throttling and expansion effect on the gases and in this way the eddies that are necessary for complete mixing and continual presentation of fresh particles of gas to the surface of the bodies will be produced.

It should be noted that the invention is not limited to the particular conical angle shown in the drawings, but it will generally be preferable to construct the units with fairly steep sides to prevent the accumulation of foreign material and to facilitate cleaning operations, this being particularly the case where the units are to be arranged in a regular manner within the tower.

I claim,

1. Bodies for use in mass as filling material in reaction, concentration or absorbent towers and other like structures, each of said filling bodies comprising two hollow truncated cones joined at their smaller ends and open from end to end.

2. Bodies for use in mass as filling material in reaction, concentration or absorbent towers and other like structures, each of said filling bodies comprising two hollow truncated cones joined at their smaller ends and open from end to end, and also comprising a collar extending circumferentially therearound at the point of least diameter.

In testimony whereof I affix my signature in presence of two witnesses.

CAMILLO JOSEPH GOODWIN.

Witnesses:
C. BLUVOM,
A. R. J. RAMSEY.